(12) United States Patent
Ngo et al.

(10) Patent No.: US 8,601,663 B2
(45) Date of Patent: Dec. 10, 2013

(54) METHODS FOR STRUCTURAL REPAIR OF COMPONENTS HAVING DAMAGED INTERNALLY THREADED OPENINGS AND COMPONENTS REPAIRED USING SUCH METHODS

(75) Inventors: Anh-Tuan Ngo, Phoenix, AZ (US); Susan Yip, Peoria, AZ (US); Calum Macintyre, Phoenix, AZ (US); Bruce Almond, Phoenix, AZ (US); Christopher Lee Cahoon, Mesa, AZ (US)

(73) Assignee: Honeywell International Inc.

( * ) Notice: Subject to any disclaimer, the term of this patent is extended or adjusted under 35 U.S.C. 154(b) by 69 days.

(21) Appl. No.: 13/372,212

(22) Filed: Feb. 13, 2012

(65) Prior Publication Data
US 2013/0209826 A1 Aug. 15, 2013

(51) Int. Cl.
*B23P 19/04* (2006.01)

(52) U.S. Cl.
USPC ............................................. 29/402.18

(58) Field of Classification Search
USPC ............ 228/119; 29/402.18, 402.17, 402.16, 29/402.15, 402.14, 402.13, 402.12, 29/402.11, 402.09, 402.08, 402.07, 29/402.06, 402.01
See application file for complete search history.

(56) References Cited

U.S. PATENT DOCUMENTS

| | | | |
|---|---|---|---|
| 2,149,826 A | 3/1939 | Albertson et al. | |
| 3,449,816 A * | 6/1969 | Swick et al. | 228/119 |
| 3,537,118 A * | 11/1970 | Neuschotz | 408/199 |
| 6,491,208 B2 * | 12/2002 | James et al. | 228/119 |
| 6,905,728 B1 | 6/2005 | Hu et al. | |
| 2003/0219542 A1 | 11/2003 | Ewasyshyn et al. | |
| 2006/0045785 A1 | 3/2006 | Hu et al. | |
| 2006/0134320 A1 | 6/2006 | DeBiccari et al. | |
| 2009/0297701 A1 | 12/2009 | Jabado et al. | |
| 2010/0187119 A1 | 7/2010 | Almond et al. | |
| 2010/0282727 A1 | 11/2010 | Kobayashi et al. | |
| 2010/0325852 A1 | 12/2010 | Frederick | |
| 2011/0088260 A1 | 4/2011 | Yoshioka et al. | |

OTHER PUBLICATIONS

Champagne, V. K., Leyman, P. F., Helfritch, D. J., "Magnesium Repair by Cold Spray", Army Research Laboratory (ARL-TR-4438), May 2008.

Leyman, P. F., Champagne, V. K., "Cold Spray Process Development for the Reclamation of the Apache Helicopter Mast Support", Army Research Laboratory (ARL-TR-4922), Aug. 2009.

* cited by examiner

*Primary Examiner* — John C Hong
(74) *Attorney, Agent, or Firm* — Ingrassia Fisher & Lorenz, P.C.

(57) ABSTRACT

Methods are provided for structurally repairing a component having a damaged internally threaded opening. The damaged internally threaded opening is machined to a predetermined diameter, thereby forming a machined opening. At least one notch is formed in the machined opening, thereby forming a notched opening. A selected amount of repair material is cold sprayed into the notched opening, including into the at least one notch. A plurality of internal threads is formed from the repair material to form a repaired internally threaded opening in the component. The repaired components are also provided.

20 Claims, 6 Drawing Sheets

METHODS FOR STRUCTURAL REPAIR OF COMPONENTS HAVING DAMAGED INTERNALLY THREADED OPENINGS AND COMPONENTS REPAIRED USING SUCH METHODS

TECHNICAL FIELD

The present invention generally relates to components and methods for repair thereof, and more particularly relates to methods for structural repair of components having damaged internally threaded openings to substantially restore the load carrying capacity thereof and components repaired using such methods.

BACKGROUND

Internal threads of internally threaded openings in components can become damaged through wear and other events. As a result of such damage, the load carrying capacity of the damaged internally threaded opening is reduced from the load carrying capacity of the undamaged, original internally threaded opening. The load carrying capacity of internally threaded openings is important as the internal threads may be used to hold, mount, or retain components against operating loads. As used herein, the term "load carrying capacity" refers to the greatest weight that the internally threaded opening can support without reducing its level of performance.

In certain circumstances, the threads of the damaged internally threaded opening can be repaired. Conventional repair methods for repairing components having damaged internally threaded openings include welding. However, welding requires heat that distorts the component and adversely affects material properties. Such distortion may undesirably change component critical dimensions. Therefore, the correction of one problem (a damaged internally threaded opening) may create another problem (changed critical dimensions). Therefore, welding is not a viable option for repairing some components, including critically dimensioned components having damaged internally threaded openings. In addition, it is always a concern when making thread repairs that the original load carrying capacity of the internally threaded opening is restored. The structural integrity of the component is compromised if the original load carrying capacity is not substantially restored. The original load carrying capacity of the damaged internally threaded opening can be restored by using an oversized insert in the damaged internally threaded opening as the bigger the thread size, the more load the internally threaded opening can carry. However, extensive damage or limited wall thickness of the damaged internally threaded opening may prevent even the use of an oversized insert. When the component cannot be repaired with weld repair or by an oversized insert, the component must undesirably be scrapped. Depending on the cost of the component, scrapping of components can be very expensive and can result in manufacturing and operational delays.

Accordingly, it is desirable to provide methods for structural repair of components having damaged internally threaded openings to substantially restore the load carrying capacity thereof and components repaired using such methods. In addition, it is desirable to restore the structural integrity of the component and be able to avoid scrapping components having damaged internally threaded openings, thereby permitting their continued use with consequent savings.

BRIEF SUMMARY

Methods are provided for structurally repairing a component having a damaged internally threaded opening. In accordance with one exemplary embodiment, a method for structurally repairing the component comprises machining the damaged internally threaded opening to a predetermined diameter, thereby forming a machined opening. At least one notch is formed in the machined opening, thereby forming a notched opening. A selected amount of repair material is cold sprayed into the notched opening, including into the at least one notch. A plurality of internal threads is formed from the repair material to form a repaired internally threaded opening in the component.

Methods are provided for structurally repairing a component comprised of a substrate having a damaged internally threaded opening therein, in accordance with yet another exemplary embodiment of the present invention. The method comprises selecting a repair material. A diameter is determined that provides a calculated shear area for a repaired internally threaded opening to be formed. The damaged internally threaded opening is machined to the determined diameter forming a machined opening. At least one notch is formed in the machined opening, resulting in a notched opening. The repair material is deposited into the notched opening including into the at least one notch by a cold spray process. A plurality of internal threads is formed from the deposited repair material.

Repaired components are provided in accordance with yet another exemplary embodiment of the present invention. The repaired component comprises a substrate comprised of a base material comprising a cast alloy and a repaired internally threaded opening in the substrate. The repaired internally threaded opening has a sidewall with at least one notch therein and a plurality of internal threads formed from a cold spray repair material on the sidewall of the repaired internally threaded opening. The cold spray repair material is also included within the at least one notch.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to methods for structural repair of components having damaged internally threaded openings and components repaired using such methods. The structural repair is performed using cold spray repair methods. As used herein, an "original internally threaded opening" refers to an internally threaded opening in the component prior to damage. As used herein, the term "structural repair" refers to the restoration of the load carrying capacity of the internally threaded opening in the component to its original (undamaged) load carrying capacity in order to maintain the structural integrity of the component. The load carrying capacity of the original internally threaded opening is the original load carrying capacity of the component. "Structural repair" excludes dimensional restoration. As used herein, and as noted above, the term "load carrying capacity" refers to the greatest weight that the component or portion thereof (the internal threads in this case) can support without reducing the level of performance. The restored load carrying capacity relies on the tensile and shear strengths of the cold sprayed repair material and the adhesive shear strength of the interface between the cold sprayed repair material and a base material of the component substrate, as hereinafter described. The structural repair of the component having the damaged internally threaded opening substantially avoids scrapping of such component, thereby permitting its continued use with consequent savings.

Figure 1:
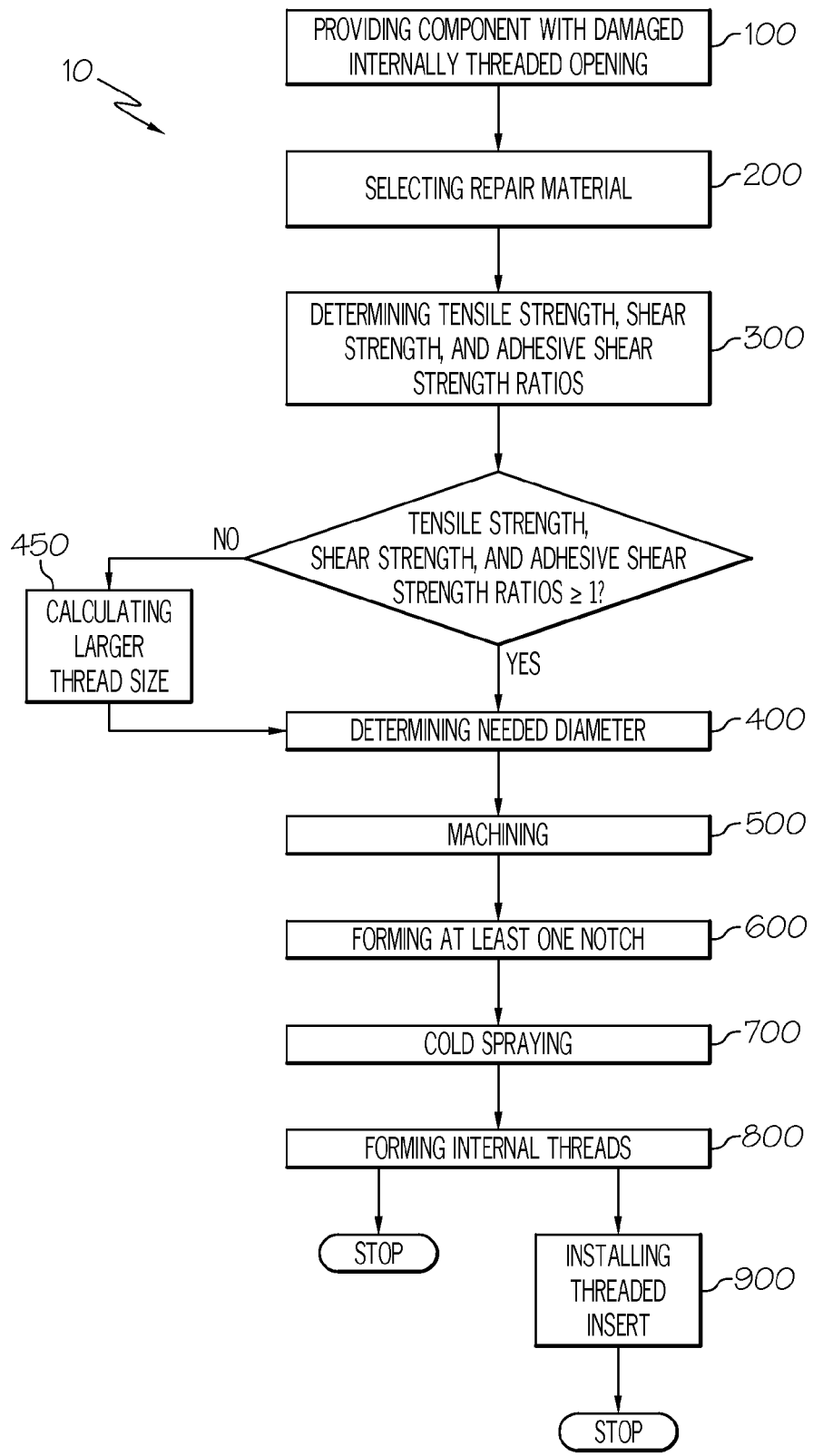
FIG. 1 is a flow chart of methods for structural repair of a component having a damaged internally threaded opening, according to exemplary embodiments of the present invention.
Figure 2:
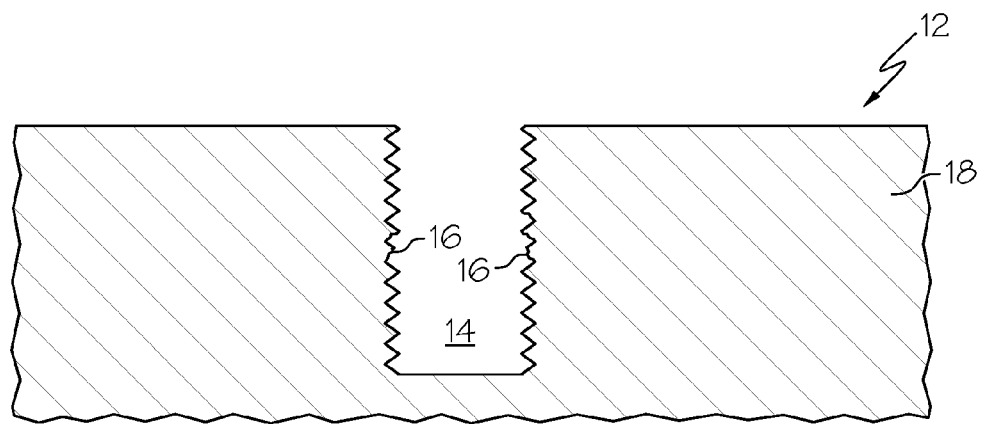
FIG. 2 is a sectional view of a component with a damaged internally threaded opening that is structurally repaired by the methods of FIG. 1.
Figure 7:
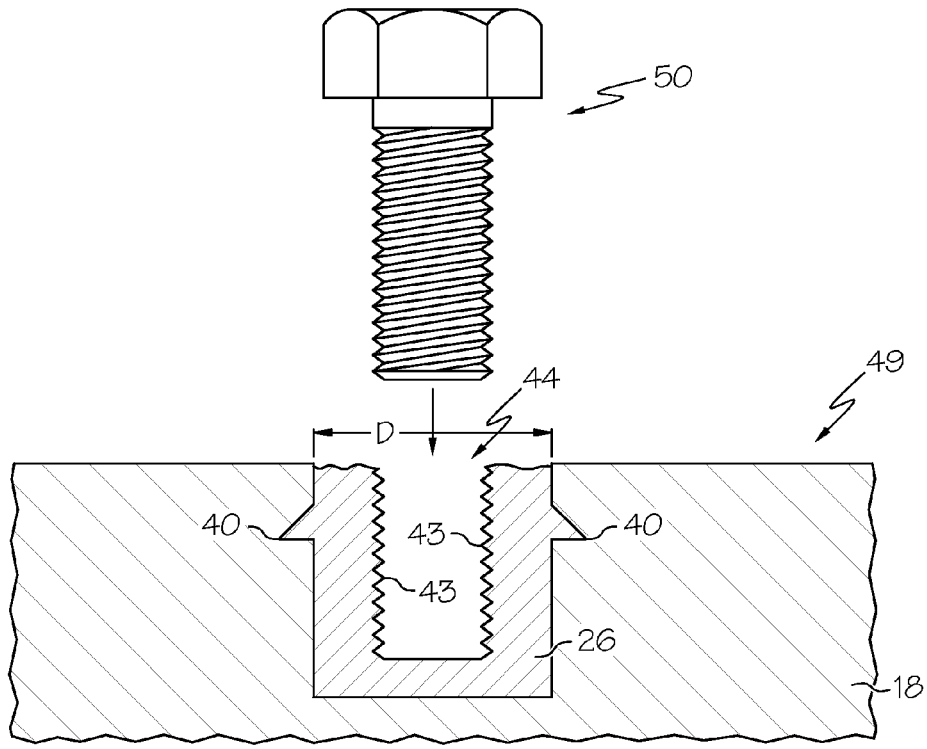
FIG. 7 is an assembly view of a repaired internally threaded opening in a repaired component configured to receive a conventional threaded fastener in an embodiment.
Figure 8A:
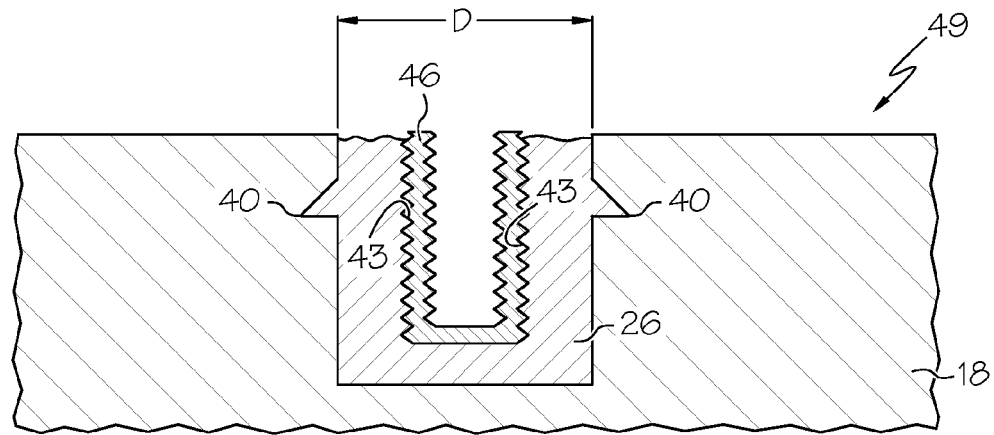
FIG. 8A is a sectional view of the repaired component of FIG. 7, illustrating a threaded insert installed into the repaired internally threaded opening thereof, in accordance with another exemplary embodiment.
Figure 8B:
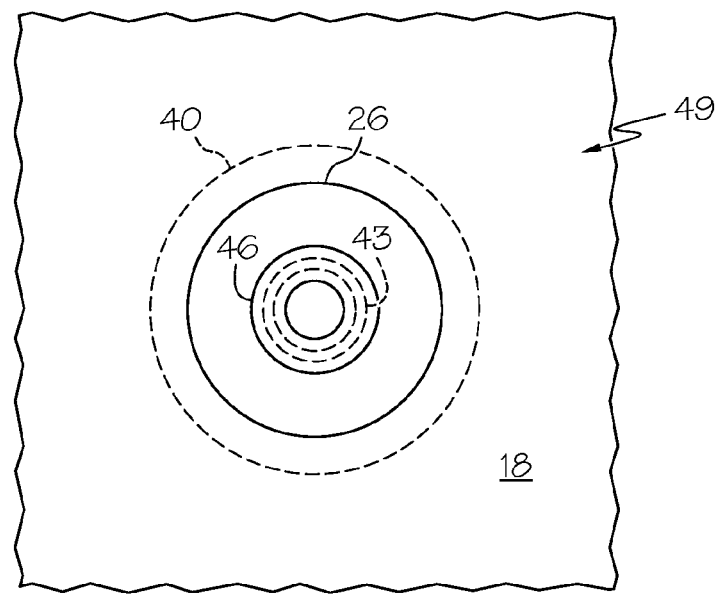
FIG. 8B is a top view of the repaired component of FIG. 8A.

Referring to FIGS. 1 and 2, according to exemplary embodiments, a method 10 for structural repair of a component having a damaged internally threaded opening begins by providing a component 12 having a damaged internally threaded opening 14 (step 100). As used herein, the term "damaged internally threaded opening" refers to an internally threaded opening having damaged internal threads 16. Prior to damage, the original internally threaded opening was configured to receive a conventional threaded fastener 50 (FIG. 7) or a threaded insert 46 (FIGS. 8A and 8B). As used herein, "damaged internal threads" refers to internal threads that do not meet thread gage pin checks of the thread minor diameter, show cracks, galling, nicks, and/or elongation, have foreign material adhering to them, do not allow mating external threads to engage, and/or do not otherwise conform to the thread standard to which they were manufactured (such as, for example, FED-STD H/28, ASME B1.1 or the like). Damaged internal threads are detected by thread gage tests and/or by visual inspection, as known in the art. As known in the art, the thread "major diameter" is the largest material diameter of a thread and "minor diameter" is the smallest material diameter of a thread.

The component 12 can be any component having the damaged internally threaded opening 14. Exemplary components include gearboxes, structural engine components, automotive components, etc. In certain exemplary embodiments, the component 12 comprises a substrate 18 formed from a base material comprising a cast alloy such as, for example, a cobalt-based alloy, a nickel-based alloy, a titanium alloy, an aluminum alloy, a magnesium alloy, and combinations thereof. In an embodiment, the cast alloy comprises a cast equiaxed alloy, i.e., the base material has the same material properties in every direction.

The load carrying capacity of the damaged internally threaded opening is reduced from its original load carry capacity such that the damaged internally threaded opening can no longer be used, in cooperation with a threaded fastener, to hold, mount, or retain components together against operating loads as originally intended, thereby reducing the structural integrity of the component. For example, the primary loading of the internally threaded opening may be to help clamp components together, putting a tensile load in the threaded fastener (such as a bolt). Internal pressure loading and inertial loading of the engine components (due to, for example, aircraft maneuvers) may also contribute to thread loads. In order to restore the load carrying capacity of the damaged internally threaded opening, the damaged internally threaded opening may be repaired forming a repaired internally threaded opening 44 in a repaired component 49 (FIGS. 7 and 8).

Still referring to FIG. 1, method 10 continues by selecting a repair material 26 (step 200). The repair material selected should be suitable for a cold spray deposition process, as hereinafter described, and have the desired material strength (tensile strength and shear strength) and bond strength (for a desired adhesive shear strength), as hereinafter described. Repair materials suitable for a cold spray process are those materials that are available in the form of particles in the size range of about one to about 50 microns in diameter. Suitable exemplary repair materials include, for example, metals such as copper, nickel, aluminum, and titanium or alloys containing copper, nickel, aluminum, titanium, tungsten carbide matrices, and combinations thereof. As specific examples, a repair material including, for example, about 60% aluminum/ 40% aluminum oxide, about 88% aluminum/12% silicon, or 100% pure aluminum powder may be used. The repair material and the base material may be the same or different.

Considerations when selecting the repair material 26 also include its ability to adhere to a substrate and not erode the substrate surface when cold sprayed. Other considerations in determining repair material suitability depend on the properties of the repair material itself such as particle size, ductility, melting point, thermal conductivity, modulus, density, and hardness as known to one skilled in the art. Another consideration when selecting a repair material is its compatibility with the substrate itself. For example, the repair material should have thermal properties, such as thermal expansion, that are compatible with the base material of the component substrate, i.e., the repair material should not have such a substantially different thermal expansion coefficient that it physically shears away from the substrate at the interface between the cold sprayed repair material and the base material of the substrate when exposed to temperature changes.

Other considerations include its porosity once sprayed. There may be additional compatibility considerations unique to the particular structural repair of the component. The suitability of the repair material is also dependent on the cold spray process parameters as hereinafter described, and known in the art.

Still referring to FIG. 1, method 10 continues by determining the tensile and shear strength ratios between the repair material and the base material, and the adhesive shear strength ratio between the interface of the repair material and the base material and the shear strength of the base material (step 300). The tensile and shear strengths of each of the repair material and the base material and the adhesive shear strength of the interface between the repair material and the base material of the substrate are known from industry specifications. The adhesive shear strength at the interface is a measure of the bond strength between the repair material molecules and the base material molecules. The shear strength of the base material is a measure of the strength of the bond between base material molecules only. The shear strength of the repair material is a measure of the strength of the bond between repair material molecules only.

The tensile strength ratio, shear strength ratio, and adhesive shear strength ratio are thus respectively determined by the following equations:

$$\text{Tensile Strength Ratio} = \frac{\text{Repair material tensile strength}}{\text{Base material tensile strength}}$$

$$\text{Shear Strength Ratio} = \frac{\text{Repair material shear strength}}{\text{Base material shear strength}}$$

$$\text{Adhesive Shear Strength Ratio} = \frac{\text{Adhesive shear strength at interface}}{\text{Base material shear strength}}$$

For the adhesive shear strength ratio, the adhesive shear strength at the interface between the base material and the repair material is compared with the shear strength at that same location on an undamaged component to see if the component has been weakened relative to its original design configuration. On an undamaged component, the component material is the base material, so the shear strength at that location is the shear strength of the base material.

In an embodiment, the selected repair material 26 has substantially the same or higher tensile and shear strength as the base material, i.e., tensile and shear strength ratios of one or greater and the adhesive shear strength of the interface is the same or higher than the shear strength of the base material making the adhesive shear strength ratio one or greater. If the base material of the component is made of a lower tensile strength and lower shear strength base material, the selected repair material may be made of a higher or same tensile strength and shear strength so that the repaired internally threaded opening to be formed can carry the same load as the original, undamaged internally threaded opening.

In another embodiment, the selected repair material 26 has a tensile strength and a shear strength that is less than, respectively, the tensile strength and the shear strength of the base material, and the adhesive shear strength of the interface is less than the shear strength of the base material, making the tensile, shear, and adhesive shear strength ratios less than one. Tensile, shear, and adhesive shear strength ratios of less than one mean that the repair material and its interface with the base material of the substrate are weaker than the base material. In this case, the diameter of a machined opening 30 (FIG. 3) to be formed is increased, as hereinafter described, in order for the repaired internally threaded opening that is formed to carry the same load as the original internally threaded opening. The larger the diameter, the more load that the repaired internally threaded opening 44 in the repaired component 49 (FIGS. 7, 8A, and 8B) can carry.

Still referring to FIG. 1, method 10 continues by determining the necessary diameter of the machined opening 30 to be formed (step 400) (also referred to herein as a "predetermined diameter"). To determine the necessary diameter, the shear area required to transfer a fastener load onto the sidewall 24 of the machined opening is calculated according to the following:

$$\text{Calculated Shear area} = \frac{\text{Fastener Load}}{\text{adhesive shear strength of the interface between the repair material and the base material of the substrate.}}$$

The fastener load is known from the component specifications (the load that the repaired component needs to carry), and includes the tensile load applied to the repaired internally threaded opening by torquing a threaded fastener therein. In addition, during operation, operating forces can also contribute to the overall fastener load. The load gets transferred to the repaired component through the interface between the base material and the cold spray repair material as hereinafter described. The adhesive shear strength of the interface is measurable by known adhesive shear strength testing methods (where the resistance of a coating to separation from a substrate due to shear forces applied parallel to the interface between the coating and the substrate is measured), or may alternatively be related to adhesion strength (where the resistance of a coating to separation from a substrate when a perpendicular tensile force is applied is measured, such as defined in ASTM C633). Once the required shear area has been calculated (i.e., the "calculated shear area"), the diameter (D) of the machined opening 30 necessary to provide the calculated shear area is determined by the following equation:

diameter(D)=Calculated shear area(from above equation)/π*h wherein:
D=diameter of the machined opening; and
h=depth of the machined opening.

The diameter (D) corresponds to the size of the drill bit used, for example, to drill out the damaged threads when forming the machined opening 30 and/or provides enough shear area for the cold sprayed repair material to adhere to a sidewall 24 of the machined opening.

If the tensile, shear, and adhesive shear strength ratios are less than one, a thread size (i.e., thread diameter) of each thread of a plurality of internal threads 43 to be formed is calculated (step 450) prior to determining the necessary diameter (D) of the machined opening (step 400) as the diameter has to be large enough to accommodate the increased thread size. To determine the necessary thread size, the thread shear area required to transfer a fastener load into the plurality of internal threads 43 to be formed is calculated according to the following:

Calculated thread shear area=Fastener Load/shear strength of the repair material The calculated thread shear area can be related to the shear strength ratio or tensile strength ratio determined by the equations noted above. For example, tensile and shear strength ratios of one-half indicate that the thread size of each internal thread in the repaired internally threaded opening should be two times larger than the diameter of a standard internal thread formed per drawing requirements. As used herein, the term "per drawing requirements" refers to the manufacturing specifications for the component 12 having the original internally threaded opening. The larger diameter internal threads that are formed when the tensile and/or shear strength ratios are less than one are referred to herein as "oversized internal threads."

While performance of step 450 prior to step 400 has been described in order to increase the diameter of the machined opening to accommodate the larger thread size, it is to be understood that as the shear strength of the repair material increases relative to the base material, the thread size of the individual internal threads decreases, with less adjustment to the thread size from drawing requirements. When the thread size approaches the thread size set forth in the drawing requirement, it may no longer be necessary to perform step 450 prior to step 400. In this case, it is to be understood that step 450 may be performed at any stage prior to forming the plurality of internal threads (step 800).

Figure 3:
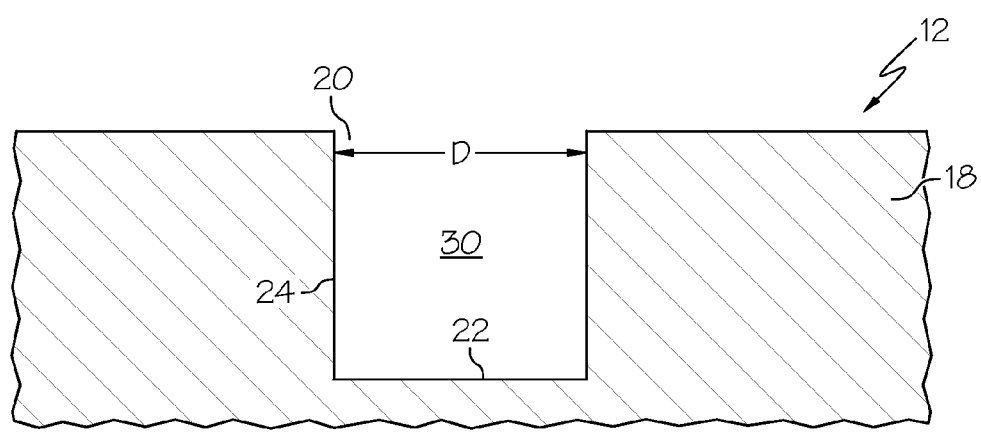
FIG. 3 is a sectional view of a machined opening.

Still referring to FIG. 1 and now to FIG. 3, method 10 continues by machining the damaged internally threaded opening 14 to the diameter (D in FIG. 3) determined in step 400 (step 500). The "machined opening" 30 is formed in step 500 and illustrated in FIG. 3, as noted above. The machined opening is cylindrical. The machined opening 30 has an upper open end 20, a closed bottom end 22 and a continuous circumferential sidewall 24. While a closed bottom end 22 is illustrated, it is to be understood that a bottom end of any of the formed openings may be open (not shown). Any machining method such as, for example, drilling, grinding, electrical discharge machining (EDM), or a combination thereof, may be used. Machining of the damaged internally threaded opening removes base material from the substrate 18 (FIG. 2) in the area immediately surrounding the damaged internally threaded opening and removes the damaged internal threads. If the adhesive shear strength ratio is less than one, the machined opening comprises an oversized machined opening having a larger diameter (D) (determined in step 400) than the machined opening in the case of an adhesive shear strength ratio of one or greater.

Figure 4:
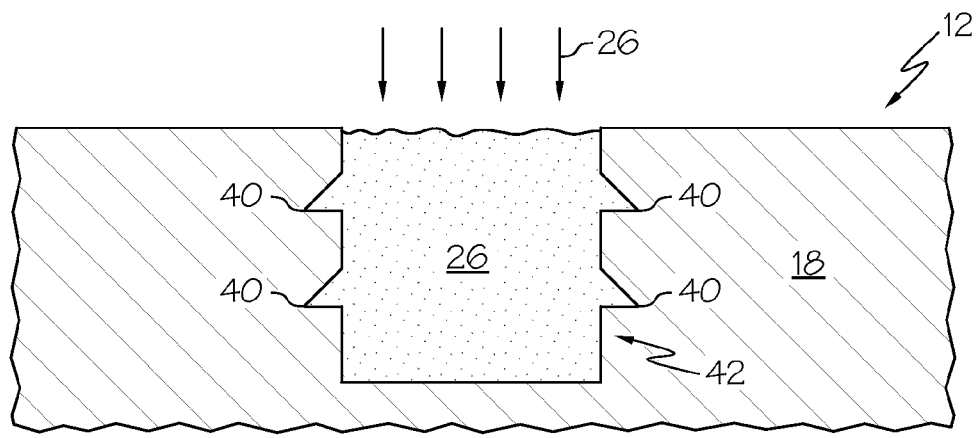
FIG. 4 is a pictorial representation of the step of cold spraying a selected amount of repair material into a notched opening in a component, including into at least one notch in a sidewall of the notched opening.
Figure 5:
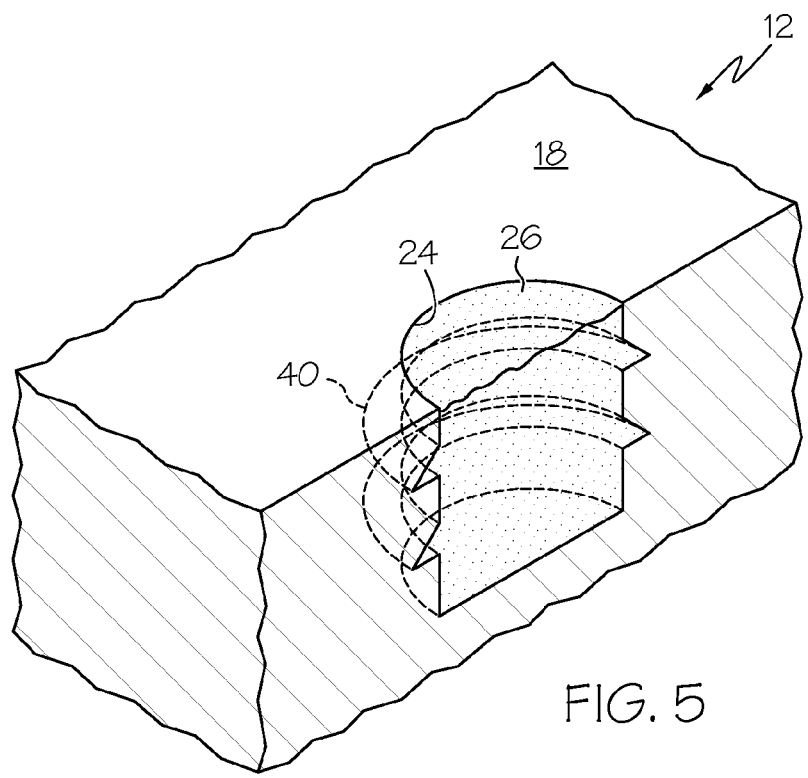
FIG. 5 is a perspective sectional view of the component of FIG. 4.
Figure 6:
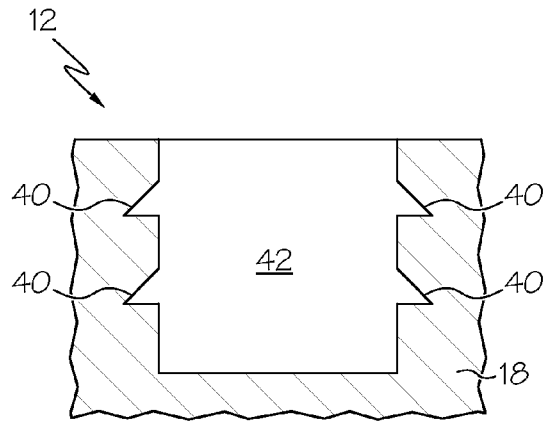
FIG. 6 is a sectional view of the notched opening of FIG. 4 without cold spray repair material therein.
Figure 6A:
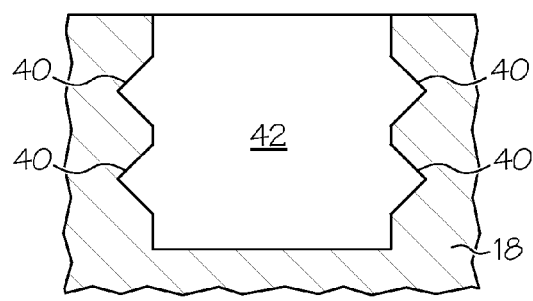
FIG. 6A is a sectional view of another notched opening, in accordance with another exemplary embodiment.

Still referring to FIG. 1 and now to FIGS. 4 through 6, method 10 continues by forming at least one notch 40 in the sidewall 24 of the machined opening, thereby forming a notched opening 42 (step 600). Two V-shaped notches are illustrated in FIGS. 4 through 6, but a fewer or greater number of notches may be used (for example, one notch is illustrated in FIGS. 7 through 8B), and the notches may be of other shapes and sizes. The at least one notch may be formed as one or more continuous rings around the sidewall as shown in FIGS. 4 through 6 or the at least one notch may be discrete cut-outs in the sidewall, in a regular pattern, an irregular pattern, or a combination thereof. Each notch of the at least one notch may have the same or a different shape, size, angle, etc., as another notch. The surfaces of each notch may be at the same or different angles relative to the axis of the notched opening 42. For example, a top surface of the plurality of V-shaped notches illustrated in FIGS. 4 through 6 is at about a 45° angle relative to the axis of the notched opening, whereas a bottom surface thereof is at about a 90° angle relative to the axis of the notched opening. FIG. 6A illustrates a notched opening 42 in accordance with another exemplary embodiment, wherein the surfaces of the plurality of V-shaped notches illustrated there are each at about a 45° angle relative to the axis of the notched opening. Therefore, in the illustrated embodiments of FIGS. 6A and 6B, at least one surface of the at least one notch is at about a 45° angle relative to the axis of the notched opening and the repaired internally threaded opening. The notched openings illustrated in FIGS. 6 and 6A, including the at least one notch, receive cold spray material, as hereinafter described. It is to be understood that one or more of the surfaces of the at least one notch may be oriented at other angles. FIG. 6 is a cross-sectional view of FIG. 4 taken vertically through the middle of the notched opening 42 thereof to illustrate the at least one notch as viewed from inside the notched opening.

In exemplary embodiments, the at least one notch is formed by machining the at least one notch into the sidewall of the machined opening using any machining method such as, for example, drilling, grinding, electrical discharge machining (EDM), or the like. While the machining and forming the at least one notch steps are described as separate steps, it is to be understood that these steps may be performed simultaneously. Exemplary dimensions for the at least one notch include a depth and height into the sidewall that is between about the major and minor thread diameters of the threaded fastener to be installed, as hereinafter described.

Still referring to FIGS. 1 and 4 through 6, method 10 continues by cold spraying a selected amount of repair material 26 into the notched opening 42 including onto the sidewall 24 thereof, and including into the at least one notch (step 700). The cold sprayed repair material substantially fills the notched opening 42 (the cavity thereof) and the at least one notch. If the tensile and shear strength ratios are one or greater, the selected amount of repair material should be sufficient to form the plurality of internal threads therefrom on the sidewall 24 of the notched opening 42 per drawing requirements, as hereinafter described. If the tensile and shear strength ratios are less than one, the selected amount of repair material comprises an excess amount of repair material. The excess amount of repair material is cold sprayed into the oversized machined opening and the plurality of internal threads comprising a plurality of the oversized internal threads is formed from the excess amount of repair material, as hereinafter described. As used herein, an "excess amount" of repair material includes the amount sufficient to form the plurality of internal threads per drawing requirements and an additional amount to form the oversized internal threads as hereinafter described. For example, in the example provided above in which the tensile and shear strength ratios were one-half, the thread size calculated in step 450 is double that of a standard thread size per drawing requirements, and the excess amount is twice the selected amount of repair material deposited when the tensile and shear strength ratios are one or greater and the plurality of internal threads is formed per drawing requirements. While the notched opening 42 of FIG. 4 is illustrated as being completely filled with cold spray repair material 26, it is to be understood that complete filling of the notched opening is unnecessary. The selected amount of repair material is cold sprayed to a thickness or depth that permits formation of the plurality of internal threads therefrom, as hereinafter described.

Figure 9:
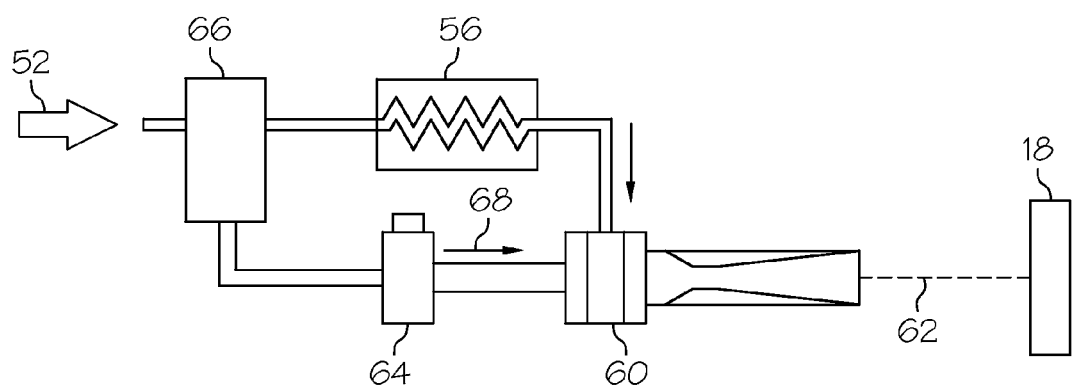
FIG. 9 is a schematic illustration of an exemplary cold spray system.

Processes using cold spraying have conventionally been used for dimensional restoration and for forming corrosion and wear-resistant coatings, but not for restoring the load carrying capacity of damaged internally threaded openings in accordance with exemplary embodiments. The cold spray process is well known in the art. In general, the cold spray process is a material-deposition process whereby particles of diameters between about 1 and about 50 microns in diameter are impacted at high velocity onto a substrate. A schematic illustration of an exemplary cold spray system is illustrated in FIG. 9. The powder particles of the repair material 26 from a powder feeder 64 are placed in a high pressure gas stream (indicated by arrow 52) that has been heated (such as by heater 56). The high pressure gas stream contains nitrogen, helium, air, or the like. Delivery of the high pressure gas stream is controlled by a gas control module 66. The high pressure gas stream, including the powdered repair material (collectively a "particle stream" 68), is then accelerated through a supersonic nozzle 60 at speeds ranging from, for example, about 1000 to about 2500 meters per second, resulting in a heated and accelerated particle stream 62. The heated and accelerated particle stream 62 is directed toward the notched opening 42 in the substrate 18, where the particles are consolidated into the solid state.

The cold spray process permits forming a plurality of internal threads from the cold sprayed repair material, as hereinafter described, and the formed threads exhibit excellent shear strength without imparting a material debit to the substrate, such as in the case of a welding repair process. As noted above, the welding repair process creates a heat-affected zone with a debit to the substrate material strength. Similarly, plasma or metal spray processes result in a much weaker porous layer that has insufficient shear strength for thread repair. Other benefits of cold spray structural repairs include being able to use a repair material having a higher shear strength to repair a component comprised of a base material with a lower shear strength, thereby improving the shear strength of the internal threads in the repaired internally threaded opening and reducing galling over the original internally threaded opening without weakening the component. The cold sprayed repair material also seals the surface of the substrate, reducing the propensity thereof for galvanic corrosion. In addition, use of an oversized insert for the repair may require removal of more base material from the substrate than is needed for the methods described herein, in order to have the oversized insert fit in the damaged internally threaded opening. Excess removal of base material may undesirably thin the sidewall of the damaged internally threaded opening. The cold spray repair only requires removal of the damaged threads, thereby advantageously minimizing thinning of the sidewall.

The repair material should be cold sprayed at a pressure and temperature sufficient to enable adequate surface bonding of the repair material to the sidewall 24 of the notched opening to substantially prevent moisture and other galvanic reactants from permeating between the cold sprayed repair material 26 and the sidewall 24 of the notched opening 42 and to impart adequate material strength of the cold sprayed repair material. Suitable pressures and temperatures are dependent on the repair material, as known to one skilled in the art. Exemplary pressures and temperatures range from about 100 psi at about 350° C. to about 600 psi at about 800° C., but lower and higher pressures and temperatures may be used depending on the selected repair material. The repair material consolidates into a solid state after cold spraying.

The at least one notch 40 in the sidewall 24 both increases the surface bonding area between the component 12 and the cold sprayed repair material 26 and comprises a mechanical locking mechanism to anchor the cold sprayed repair material 26 in the repaired internally threaded opening to be formed, as hereinafter described. The at least one notch 40 helps compensate for structural deficits, if any, of the cold spray repair material itself. As noted above, the at least one surface of the at least one notch may be configured to receive the cold sprayed repair material at about a 45° angle relative to the axis of the notched opening.

Still referring to FIG. 1 and now to FIG. 7, method 10 continues by forming a plurality of internal threads 43 from the repair material (that was deposited in step 700) that resides on the sidewall 24 of the notched opening 42 (step 800), thereby forming the repaired internally threaded opening 44 in the component. The plurality of internal threads is formed after the repair material has been consolidated in the solid state. The step of forming the plurality of internal threads comprises drilling a pilot hole into the cold sprayed repair material 26 and then tapping the plurality of internal threads in the cold sprayed repair material 26, referred to commonly as a "drill and tap process". The pilot hole substantially prevents shearing of the cold sprayed repair material from the sidewall while tapping the new threads. The plurality of internal threads is formed from the cold sprayed repair material that resides on the sidewall. The plurality of internal threads may be in any thread form. The most widely used thread forms are the Square and the Acme thread forms, but any thread form may be tapped. As noted above, if the tensile and shear strength ratios are one or greater, the internal threads are formed per drawing requirements, thus completing the repair of the internally threaded opening. If the tensile and shear strength ratios are less than one, the plurality of oversized internal threads is formed having the increased diameter thread size as calculated in step 450.

In an embodiment, the repaired internally threaded opening 44 is configured to receive a conventional threaded fastener 50 (such as the bolt illustrated in FIG. 7). Other types of threaded fasteners include a heli-coil, a stud, or an AN port-type. In another embodiment, referring to FIGS. 1, 8A, and 8B, method 10 continues by optionally installing a threaded insert 46 (FIGS. 8A and 8B) or the like into the repaired internally threaded opening 44 (step 900). The repaired internally threaded opening 44 is configured to receive the threaded insert 46. A standard size threaded insert may be installed in the repaired internally threaded opening. Alternatively, an oversized threaded insert may be installed in the repaired oversized internally threaded opening. The conventional threaded fastener 50 may then be installed in the threaded insert 46.

It is to be appreciated that the methods for structural repair of components having damaged internally threaded openings as described herein substantially restore the load carrying capacity of the internally threaded openings without a distorting heat treatment, such that the components having the damaged internally threaded openings do not have to be scrapped. Such components can continue to be used with the consequent savings. The repaired internally threaded opening can carry substantially the same load as the original undamaged internally threaded opening.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for structurally repairing a component having a damaged internally threaded opening, the method comprising the steps of:
   machining the damaged internally threaded opening to a predetermined diameter, thereby forming a machined opening, the predetermined diameter=

Calculated shear area/Depth of Machined Opening $(h) \times 3.142(\pi)$, and wherein the calculated shear area=
   Fastener Load/adhesive shear strength of an interface between the repair material and a base material of the component;
   forming at least one notch in the machined opening, thereby forming a notched opening;
   cold spraying a selected amount of repair material into the notched opening, including into the at least one notch; and
   forming a plurality of internal threads from the cold sprayed repair material to form a repaired internally threaded opening in the component.

2. The method of claim 1, wherein the machined opening comprises a sidewall and the step of forming the at least one notch in the machined opening comprises forming the at least one notch in the sidewall thereof.

3. The method of claim 2, wherein the step of forming the at least one notch in the machined opening comprises forming at least one surface of the at least one notch at about a 45° angle relative to an axis of the machined opening.

4. The method of claim 1, wherein the step of cold spraying a selected amount of repair material comprises cold spraying the repair material to a thickness that permits formation of the plurality of internal threads from the selected amount of repair material.

5. The method of claim 1, wherein the step of cold spraying a selected amount of repair material comprises cold spraying an excess amount of repair material and the step of forming a plurality of internal threads comprises forming a plurality of oversized internal threads from the excess amount of repair material, each individual oversized internal thread of the plurality of oversized internal threads with a thread size determined by one or both of $$\text{tensile and shear strength ratios} = \frac{\text{Repair material tensile and/or shear strength}}{\text{Base material tensile and/or shear strength}}.$$

6. The method of claim 1, further comprising the step of installing a threaded insert into the repaired internally threaded opening.

7. The method of claim 6, wherein the repaired internally threaded opening comprises an oversized repaired internally threaded opening, and the step of installing a threaded insert comprises installing an oversized threaded insert.

8. A method for structural repair of a component comprised of a substrate having a damaged internally threaded opening therein, the method comprising the steps of:
   selecting a repair material;
   determining a diameter that provides a calculated shear area for a repaired internally threaded opening to be formed;
   machining the damaged internally threaded opening to the determined diameter forming a machined opening;
   forming at least one notch in the machined opening resulting in a notched opening;
   depositing the repair material into the notched opening including into the at least one notch by a cold spray process; and
   forming a plurality of internal threads from the deposited repair material,
   wherein the step of determining a diameter comprises determining the $$\text{diameter} = \frac{\text{Calculated shear area}}{\text{Depth of Machined Opening (h)} \times 3.142\,(\pi)};$$

and wherein the $$\text{calculated shear area} = \frac{\text{Fastener Load}}{\text{adhesive shear strength of an interface between the repair material and a base material of the component}}.$$

9. The method of claim 8, wherein the machined opening comprises a sidewall and the step of forming at least one notch in the machined opening comprises forming the at least one notch in the sidewall thereof.

10. The method of claim 9, wherein the step of forming at least one notch in the machined opening comprises forming at least one surface of the at least one notch at about a 45° angle relative to an axis of the machined opening.

11. The method of claim 8, wherein the step of depositing the repair material comprises depositing a sufficient amount of the repair material to form a plurality of internal threads therefrom and the step of forming a plurality of internal threads comprises forming the plurality of internal threads per drawing requirements.

12. The method of claim 8, wherein the step of depositing the repair material comprises depositing an excess amount of repair material and the step of forming a plurality of internal threads comprises forming a plurality of oversized internal threads from the excess amount of repair material, each individual oversized internal thread of the plurality of oversized internal threads having a thread size determined by one or both of $$\text{tensile and shear strength ratios} = \frac{\text{Repair material tensile strength and/or shear strength}}{\text{Base material tensile strength and/or shear strength}}.$$

13. The method of claim 8, further comprising the step of installing a threaded insert into the repaired internally threaded opening.

14. The method of claim 13, wherein the repaired internally threaded opening comprises an oversized repaired internally threaded opening, and the step of installing a threaded insert comprises installing an oversized insert.

15. A method for structurally repairing a component having a damaged internally threaded opening, the method comprising the steps of:
   machining the damaged internally threaded opening to a predetermined diameter, thereby forming a machined opening;

forming at least one notch in the machined opening, thereby forming a notched opening;

cold spraying a selected amount of repair material into the notched opening including into the at least one notch and onto a bottom end of the notched opening; and forming a plurality of internal threads from the cold sprayed repair material to form a repaired internally threaded opening in the component.

16. The method of claim 15, further comprising the step of determining the diameter prior to the machining step, the predetermined $$\text{diameter} = \frac{\text{Calculated shear area}}{\text{Depth of Machined Opening } (h) \times 3.142(\pi)}; \text{ and}$$

wherein the calculated shear area =

$$\frac{\text{Fastener Load}}{\text{adhesive shear strength of an interface between the repair material and a base material of the component}}.$$

17. The method of claim 15, wherein the machined opening comprises a sidewall and the step of forming the at least one notch in the machined opening comprises forming the at least one notch in the sidewall thereof.

18. The method of claim 17, wherein the step of forming the at least one notch in the machined opening comprises forming at least one surface of the at least one notch at about a 45° angle relative to an axis of the machined opening.

19. The method of claim 15, wherein the step of cold spraying a selected amount of repair material comprises cold spraying the repair material to a thickness that permits formation of the plurality of internal threads from the selected amount of repair material.

20. The method of claim 15, wherein the step of cold spraying a selected amount of repair material comprises cold spraying an excess amount of repair material and the step of forming a plurality of internal threads comprises forming a plurality of oversized internal threads from the excess amount of repair material, each individual oversized internal thread of the plurality of oversized internal threads with a thread size determined by one or both of tensile and shear strength ratios =

$$\frac{\text{Repair material tensile and/or shear strength}}{\text{Base material tensile and/or shear strength}}.$$

\* \* \* \* \*